US010663648B2

(12) United States Patent
Yoo et al.

(10) Patent No.: US 10,663,648 B2
(45) Date of Patent: May 26, 2020

(54) DISPLAY APPARATUS

(71) Applicant: SAMSUNG ELECTRONICS CO., LTD., Suwon-si (KR)

(72) Inventors: Jun-Mo Yoo, Yongin-si (KR); Joon Seok Ahn, Suwon-si (KR); Kye Hoon Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/131,907

(22) Filed: Sep. 14, 2018

(65) Prior Publication Data

US 2019/0086608 A1 Mar. 21, 2019

(30) Foreign Application Priority Data

Sep. 15, 2017 (KR) ........................ 10-2017-0118816

(51) Int. Cl.
*F21V 8/00* (2006.01)
*G02B 6/00* (2006.01)
*G02F 1/13357* (2006.01)
*G02F 1/1333* (2006.01)

(52) U.S. Cl.
CPC ........... *G02B 6/0088* (2013.01); *G02B 6/005* (2013.01); *G02B 6/0053* (2013.01); *G02B 6/0055* (2013.01); *G02F 1/1336* (2013.01); *G02B 6/0065* (2013.01); *G02F 1/133615* (2013.01); *G02F 2001/133317* (2013.01); *G02F 2001/133322* (2013.01); *G02F 2001/133614* (2013.01); *G02F 2202/043* (2013.01); *G02F 2202/28* (2013.01)

(58) Field of Classification Search
CPC .......................... G02B 6/0088; G02B 6/0053
See application file for complete search history.

(56) References Cited

U.S. PATENT DOCUMENTS

| 2007/0019410 | A1  | 1/2007 | Kim et al. |
| 2009/0213464 | A1* | 8/2009 | Kurachi ............... G02B 5/0242 359/599 |
| 2010/0246626 | A1* | 9/2010 | Van Sprang ......... G02B 6/0076 372/50.1 |

(Continued)

FOREIGN PATENT DOCUMENTS

KR 10-2012-0015190 A 2/2012

OTHER PUBLICATIONS

Communication dated Nov. 8, 2018, issued by the European Patent Office in counterpart European Application No. 18194227.7.

(Continued)

*Primary Examiner* — Alexander K Garlen
*Assistant Examiner* — Eric T Eide
(74) *Attorney, Agent, or Firm* — Sughrue Mion, PLLC

(57) ABSTRACT

A display apparatus includes: a display panel; and a backlight configured to supply light to the display panel, wherein the backlight includes a light source configured to emit light; and a light guide plate provided on a rear side of the display panel and configured to guide the light emitted by the light source toward to the display panel; and a plurality of optical sheets provided between the light guide plate and the display panel, an optical sheet of the plurality of optical sheets being attached to a front surface of the light guide plate.

14 Claims, 7 Drawing Sheets

(56) References Cited

U.S. PATENT DOCUMENTS

| | | | |
|---|---|---|---|
| 2011/0175518 A1* | 7/2011 | Reed .......................... | F21V 7/05 |
| | | | 313/483 |
| 2012/0163013 A1* | 6/2012 | Buelow, II ............. | G02B 6/001 |
| | | | 362/555 |
| 2013/0335677 A1* | 12/2013 | You .................... | G02F 1/133609 |
| | | | 349/65 |
| 2016/0103267 A1* | 4/2016 | An ....................... | G02B 6/0023 |
| | | | 362/606 |
| 2016/0109635 A1* | 4/2016 | Lee ..................... | G02B 6/0026 |
| | | | 349/65 |
| 2016/0223739 A1 | 8/2016 | Yoon et al. | |
| 2017/0052408 A1 | 2/2017 | Takada et al. | |
| 2018/0095217 A1* | 4/2018 | Min ......................... | G02B 1/14 |
| 2018/0143369 A1* | 5/2018 | Kim .................... | G02B 6/0035 |

OTHER PUBLICATIONS

Communication dated Jun. 6, 2019, issued by the European Patent Office in counterpart European Application No. 18194227.7.

* cited by examiner

DISPLAY APPARATUS

CROSS-REFERENCE TO RELATED APPLICATION

This application is based on and claims priority under 35 U.S.C. § 119 to Korean Patent Application No. 10-2017-0118816, filed on Sep. 15, 2017, in the Korean Intellectual Property Office, the disclosure of which is incorporated by reference herein in its entirety.

BACKGROUND

1. Field

The disclosure relates to a display apparatus having a backlight for supplying light to a display panel.

2. Description of Related Art

A display apparatus is an apparatus for displaying screens by receiving video signals, and may be a television or a monitor.

The display apparatus includes a display panel on which the screen is displayed and a backlight disposed on a rear side of the display panel to supply light to the display panel.

The backlight includes a light guide plate, light emitting diodes disposed on sides of the light guide plate, and optical sheets disposed between the display panel and the light guide plate to improve optical properties of light.

SUMMARY

Provided is a display apparatus that may be more easily manufactured.

In accordance with an aspect of the disclosure, there is provided a display apparatus including: a display panel; and a backlight configured to supply light to the display panel, wherein the backlight includes a light source configured to emit light; and a light guide plate provided on a rear side of the display panel and configured to guide the light emitted by the light source toward to the display panel; and a plurality of optical sheets provided between the light guide plate and the display panel, an optical sheet of the plurality of optical sheets being attached to a front surface of the light guide plate, and the plurality of optical sheets may include a quantum dot sheet configured to increase color reproducibility; and a prism sheet attached to a front surface of the quantum dot sheet, wherein the quantum dot sheet and the prism sheet are attached to each other by a plurality of portions of an adhesive that are spaced apart from each other so that an air layer is provided between the quantum dot sheet and the prism sheet.

The light source may include a light emitting diode configured to generate blue light, wherein the plurality of optical sheets further comprise a first dichroic sheet attached to the front surface of the light guide plate and configured to selectively pass blue light, and wherein the quantum dot sheet is attached to a front surface of the first dichroic sheet.

The display apparatus may further include a reflective sheet attached to a rear surface of the light guide plate and configured to reflect light.

The reflective sheet may include: a second dichroic sheet attached to the rear surface of the light guide plate and configured to selectively pass blue light; and a white sheet attached to a rear surface of the second dichroic sheet.

The reflective sheet may further include a mirror sheet attached to the rear surface of the light guide plate.

The light source may include a light emitting diode configured to generate white light, and the plurality of optical sheets may include: a prism sheet attached to the front surface of the light guide plate, wherein the prism sheet and the light guide plate are attached to each other by a plurality of portions of an adhesive that are spaced apart from each other to form an air layer between the prism sheet and the light guide plate.

One of the plurality of optical sheets may be attached to a rear surface of the display panel.

The optical sheet of the plurality of optical sheets may be attached to the front surface of the light guide plate by a plurality of portions of an adhesive that are spaced apart from each other so that an air layer is provided between the light guide plate and the optical sheet.

In accordance with another aspect of the disclosure, there is provided a display apparatus including: a display panel; a light guide plate provided on a rear side of the display panel; and a plurality of optical sheets, one of the plurality of optical sheets being attached to a front surface of the light guide plate, wherein at least two optical sheets of the plurality of optical sheets are attached to each other by a plurality of portions of an adhesive that are spaced apart from each other so that an air layer is provided between the at least two optical sheets.

The at least two optical sheets may include a quantum dot sheet and a prism sheet attached to a front surface of the quantum dot sheet by the plurality of portions of the adhesive so that the air layer is provided between the quantum dot sheet and the prism sheet.

In accordance with another aspect of the disclosure, there is provided a display apparatus including: a display panel; a light guide plate; and at least one optical sheet provided between the display panel and the light guide plate, wherein the at least one optical sheet is attached to a surface of the light guide plate by a plurality of portions of an adhesive that are spaced apart from each other so that an air layer is provided between the light guide plate and the at least one optical sheet.

The at least one optical sheet may include a prism sheet.

The at least one optical sheet further include a diffusion sheet.

The display apparatus may further include a reflective sheet attached to a rear surface of the light guide plate and configured to reflect light.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
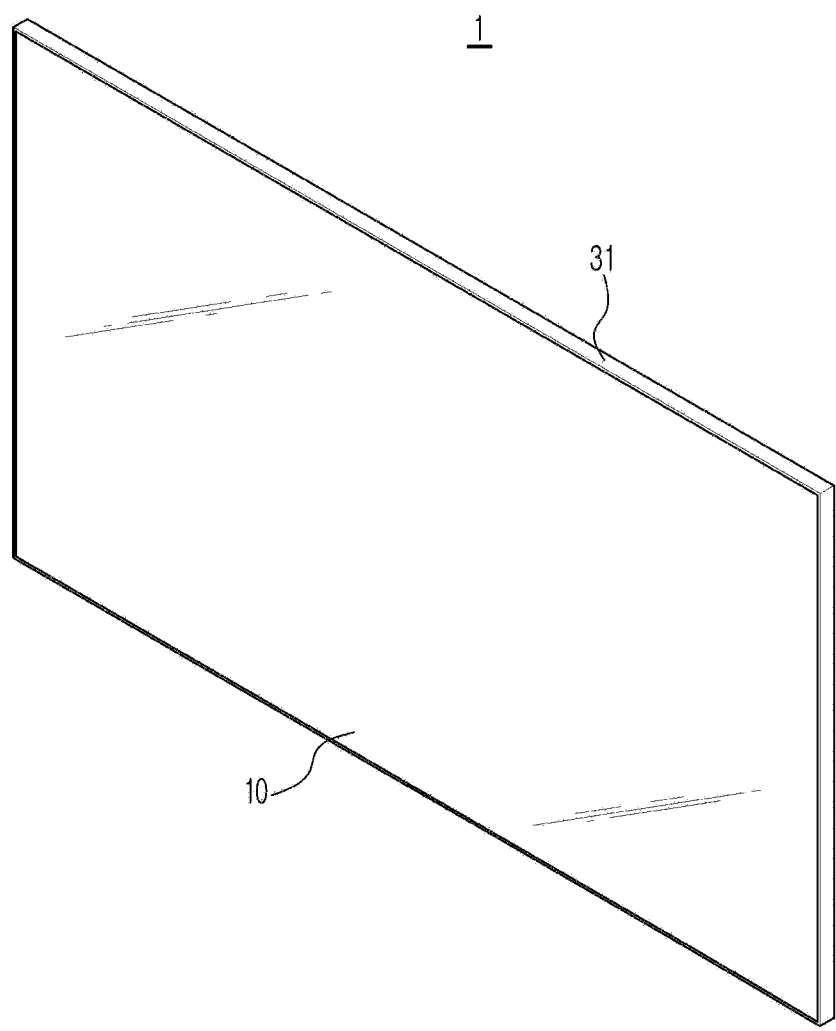
FIG. 1 is a perspective view illustrating a display apparatus according to an embodiment.

Configurations illustrated in the embodiments and the drawings described in the specification are only examples of the disclosure, and it is thus to be understood that various modifications may be made to replace the embodiments and the drawings.

Also, like reference numerals or symbols denoted in the drawings of the specification represent members or components that perform the substantially same functions.

The terms used in the specification are used to describe the embodiments of the disclosure. Accordingly, it should be apparent to those skilled in the art that the following description of embodiments of the disclosure is provided for illustration purposes only and not for the purpose of limiting the disclosure as defined by the appended claims and their equivalents. It is to be understood that the singular forms "a," "an," and "the" include plural referents unless the context clearly dictates otherwise. It will be understood that the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the disclosure. As used herein, the term "and/or" includes any and all combinations of one or more of associated listed items.

In the following description, the terms "front end", "rear end", "upper portion", "lower portion", "upper end", and "lower end" are defined based on the drawings, and do not intend to limit shapes and locations of individual components.

Hereinafter, a display apparatus according to embodiments of the disclosure will be described in detail with reference to the accompanying drawings.

Referring to FIG. 1, a display apparatus 1 is an apparatus for displaying image information and may include a television or monitor used as a computer output device, which remotely receives radio waves to display images.

The display apparatus 1 may be a flat display apparatus having a flat screen as shown in the embodiment, or a curved display apparatus in which the screen is curved, or a bendable display apparatus in which the screen may be changed from flat to curved, from curved to flat, or the curvature of the screen is changeable.

The display apparatus 1 may be installed on an indoor or outdoor floor or furniture in a standing configuration, or may be installed on or in a wall in a wall mount configuration.

Figure 2:
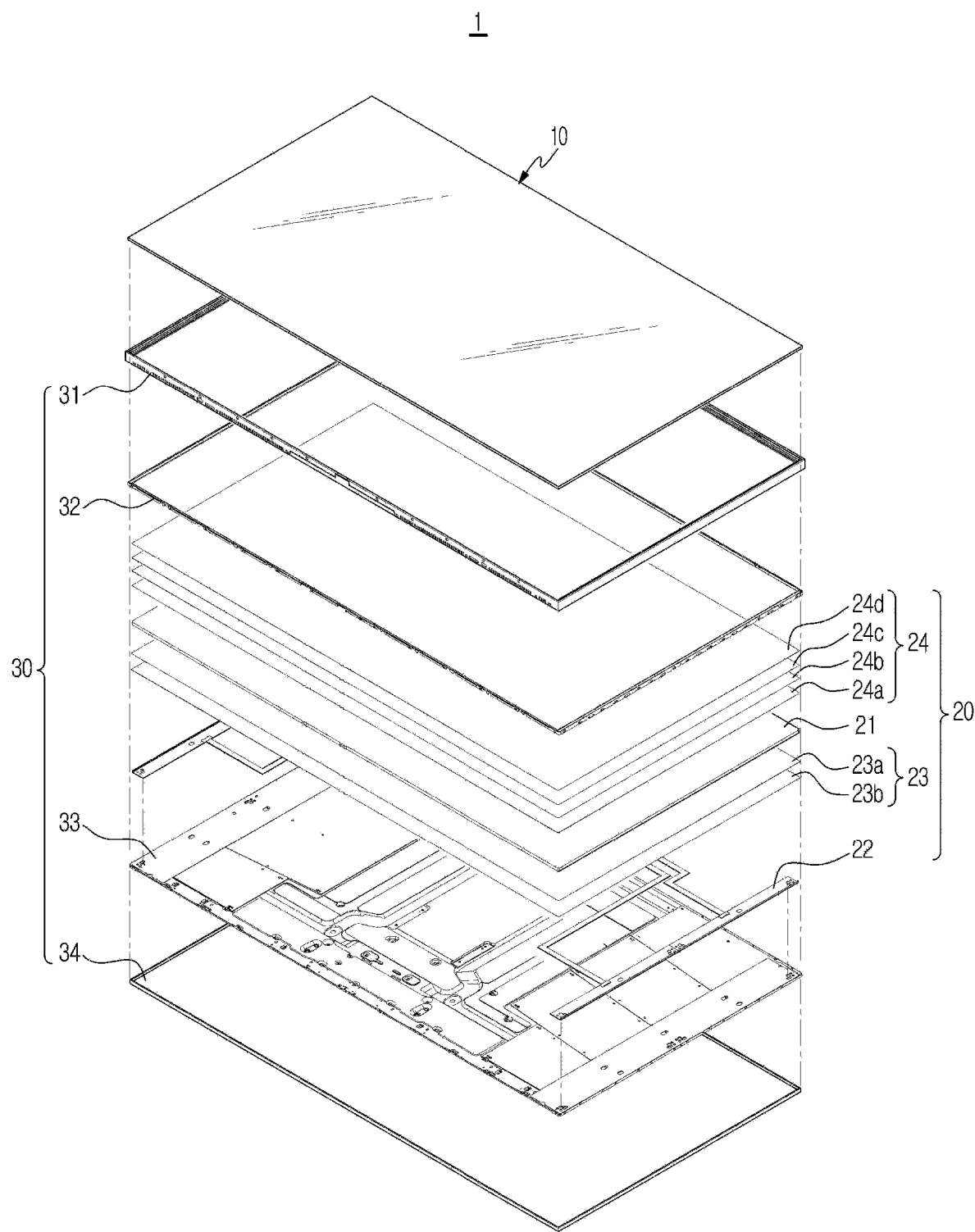
FIG. 2 is an exploded perspective view illustrating the display apparatus according to an embodiment.
Figure 3:
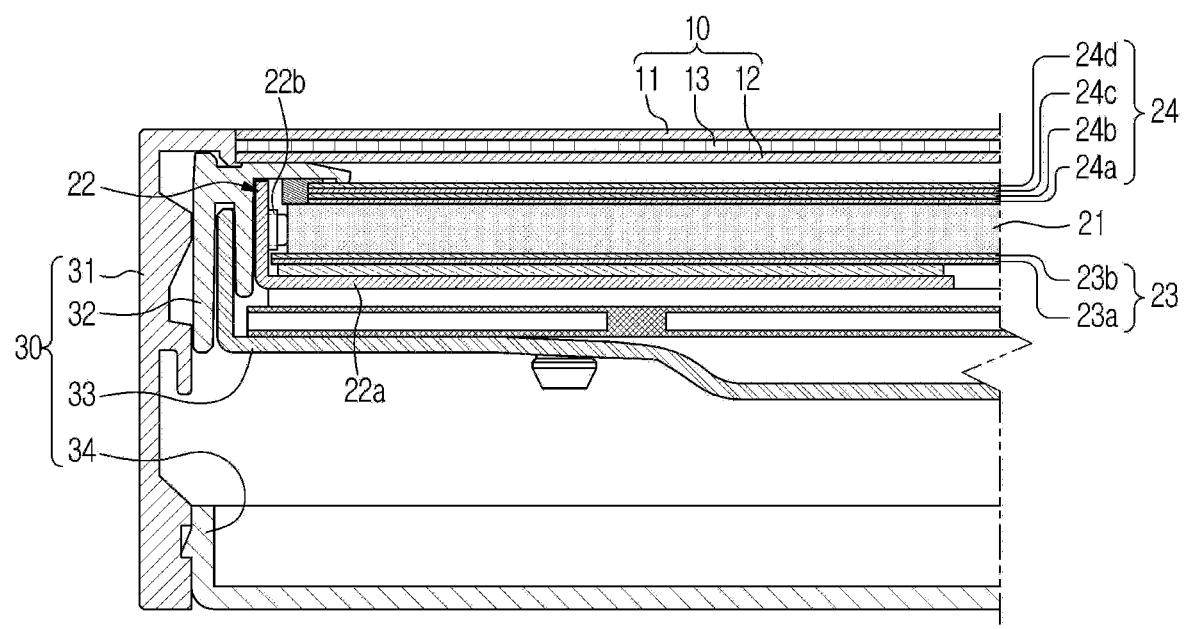
FIG. 3 is a cross-sectional view illustrating the display apparatus according to an embodiment.

Referring to FIGS. 2 and 3, the display apparatus 1 includes a display panel 10 to display an image, a backlight 20 to supply light to the display panel 10, and a chassis assembly 30 to support the display panel 10 and the backlight 20.

The display panel 10 displays an image using liquid crystals whose optical properties change according to changes in voltage and temperature. The display panel 10 has the shape of a substantially rectangular flat plate and includes a pair of glass substrates 11 and 12 spaced apart from each other in a front-to-rear direction, and liquid crystals 13 disposed between the pair of glass substrates 11 and 12.

The backlight 20 is disposed behind the display panel 10 to supply light to the display panel 10.

The backlight 20 includes a light source 22 to generate light, a light guide plate 21 formed in a rectangular flat plate shape and disposed on the rear side of the display panel 10, and a plurality of optical sheets 24 disposed between the rear surface of the display panel 10 and the front surface of the light guide plate 21 to improve properties of light.

The light guide plate 21 is made of a transparent material such as Poly Methyl Methacrylate Acrylate (PMMA). Various patterns may be formed on the front surface of the light guide plate 20 to change light paths.

The light source 22 includes two printed circuit boards 22a extending vertically to correspond to opposite side ends of the light guide plate 21 and a plurality of light emitting diodes 22b disposed vertically on the two printed circuit boards 22a.

The printed circuit board 22a is bent generally in the form of the letter 'L'. A rear side portion of the printed circuit board 22a parallel to the light guide plate 21 is supported on the rear surface of the light guide plate 21. The light emitting diodes 22b are installed on a side surface of the front side of the printed circuit board 22a facing a side surface of the light guide plate 21.

The light emitting diodes 22b may be blue light emitting diodes that generate blue light. The light emitting diodes 22b are disposed to face the opposite sides of the light guide plate 21. Therefore, the light generated from the light emitting diodes 22b is changed to surface light through the light guide plate 21 and supplied to the display panel 10.

Although the light emitting diodes 22b are shown in this embodiment to be disposed to face the opposite sides (left and right sides) of the light guide plate 21, this is merely an example. For example, the light emitting diodes 22b may be arranged to face upper and lower side surfaces of the light guide plate 21. Also, the light emitting diodes 22b may be disposed to face only one of the upper, lower, left, and right sides of the light guide plate, or disposed to face all of the four sides of the light guide plate 21.

The optical sheets 24 include a first dichroic sheet 24a disposed on the front surface of the light guide plate 21, a quantum dot sheet 24b disposed on the front surface of the first dichroic sheet 24a, a prism sheet 24c disposed on the front surface of the quantum dot sheet 24b, and a diffusion sheet 24d to diffuse light.

The first dichroic sheet 24a is formed in a sheet and selectively passes or reflects light according to a wavelength of the light. The first dichroic sheet 24a passes the blue light and reflects light of other colors.

The quantum dot sheet 24b improves color reproducibility by changing the wavelength of light. Quantum dots, which are light emitting semiconductor crystals a few nanometers in size, are distributed in the quantum dot sheet 24b.

Quantum dots in the quantum dot sheet receive blue light and generate light of various wavelengths depending on their size. That is, light having all the visible light colors may be generated by the quantum dots.

The prism sheet 24c improves brightness of light supplied from the backlight 20 by concentrating the light.

The diffusion sheet 24d diffuses light transmitted from the rear side of the diffusion sheet 24d so that the light supplied from the backlight 20 has a uniform light distribution.

The reflective sheets 23 include a second dichroic sheet 23a attached to the rear surface of the light guide plate 21, and a white sheet 23b disposed on the rear surface of the second dichroic sheet 23a. The second dichroic sheet 23a reflects the blue light emitted rearward from the light guide plate 21 to the light guide plate 21 and the white sheet 23b reflects the white light emitted from the quantum dot sheet 24b.

In this embodiment, the second dichroic sheet 23a and the white sheet 23b are used for the reflective sheets 23, but embodiments are not limited thereto. For example, a mirror sheet may be used for the reflective sheet.

The chassis assembly 30 includes a top chassis (i.e., front chassis) 31 to support the display panel 10, a middle mold 32 to support the light guide plate 21, a bottom chassis (i.e., rear chassis) 33 to receive the backlight 20, and a rear cover 34 to cover the rear side of the bottom chassis 33.

The top chassis 31 is formed as a rectangular frame on the front of the display apparatus 1 to support the display panel 10. The top chassis 31 covers side surfaces of the display panel 10 and the middle mold 32 to serve as a case.

The middle mold 32 is coupled to the rear of the top chassis 31 and the bottom chassis 33 is coupled to the rear of the middle mold 32. The middle mold 32 supports the light guide plate 21 and the outer side of the front of the optical sheet 24.

The bottom chassis 33 has the shape of a substantially rectangular plate and is coupled to the rear of the middle mold 32. The bottom chassis 33 is formed of a metal material such as aluminum or stainless steel having a good thermal conductivity to radiate heat generated from the light source 22, but the bottom chassis 33 may be formed of a plastic material such as acrylonitrile butadiene styrene (ABS).

Various printed circuit boards to control the display apparatus 1 may be installed on the rear surface of the bottom chassis 33. The rear cover 34 is coupled to the rear side of the top chassis 31 to cover the printed circuit boards installed on the rear surface of the chassis 33.

Although the chassis assembly 30 includes the top chassis 31, the middle mold 32, the bottom chassis 33 and the rear cover 34 in the embodiment, at least one of the components of the chassis assembly 30 may be omitted or some of them may be integrated together.

The optical sheets 24 are sequentially attached to the front surface of the light guide plate 21 to form a light guide module for guiding the light generated from the light source 22 to the display panel.

Specifically, the light guide module is formed by the light guide plate 21, the first dichroic sheet 24a attached to the front surface of the light guide plate 21, the quantum dot sheet 24b attached to the front surface of the first dichroic sheet 24a, the prism sheet 24c attached to the front surface of the quantum dot sheet 24b and the diffusion sheet 24d attached to the front surface of the prism sheet 24c.

Furthermore, the light guide module may include reflective sheets 23. Specifically, the second dichroic sheet 23a is attached to the back of the light guide plate 21 and the white sheet 23b is attached to the rear of the second dichroic sheet 23a so that the reflective sheets 23 are included in the light guide module.

Once the light guide module is formed by integrating the optical sheets 24 and the reflective sheets 23 on the light guide plate 21, the light guide module is installed on the bottom chassis 33, completing installation of the light guide plate 21, the optical sheets 24 and the reflective sheets 23 at once. Accordingly, manufacturing of the display apparatus 1 becomes easier.

In order to maintain a diffusion angle of light generated from the quantum dot sheet 24b below a predetermined angle, an air layer may be formed between the quantum dot sheet 24b and the prism sheet 24c.

Accordingly, the quantum dot sheet 24b and the prism sheet 24c are attached to each other by an adhesive 25 applied as dots spaced apart from each other so that an air layer (or air gap) G is formed between the quantum dot sheet 24b and the prism sheet 24c. In other words, the quantum dot sheet 24b and the prism sheet 24c are attached to each other by a plurality of portions of the adhesive 25 that are spaced apart from each other so that the quantum dot sheet 24b is spaced apart from the prism sheet 24c by the plurality of portions of the adhesive 25.

Figure 4:
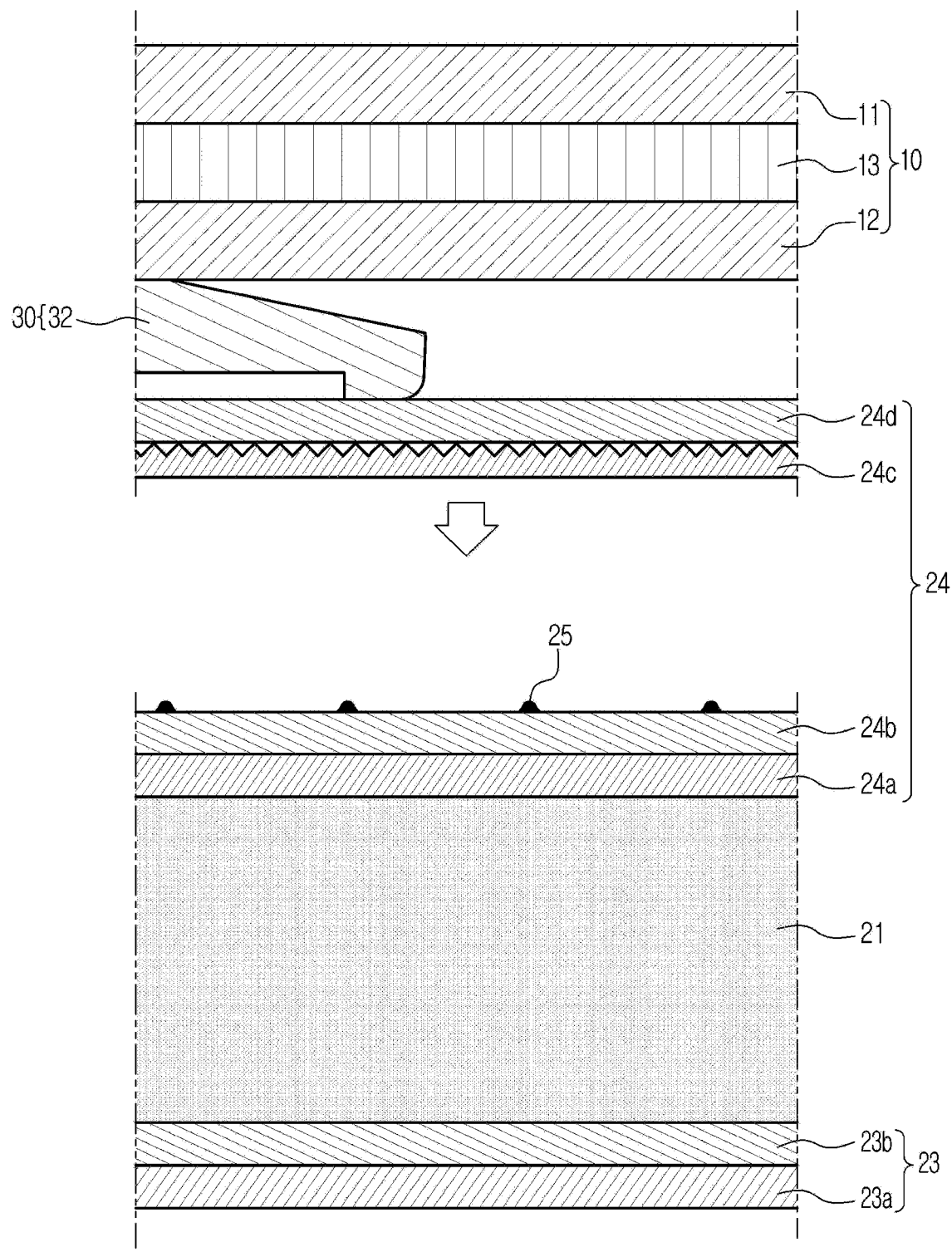
FIGS. 4 and 5 are cross-sectional views illustrating a manufacturing process of a light guide module applied to the display apparatus according to an embodiment.

Referring to FIG. 4, the adhesive 25 is applied on the front surface of the quantum dot sheet 24b, but is limitedly applied to very small areas, and the areas to which the adhesive 25 is applied are sufficiently spaced apart from each other. In this state, the prism sheet 24c is attached to the front surface of the quantum dot sheet 24b as shown in FIG. 5.

When the quantum dot sheet 24b and the prism sheet 24c are attached in the above manner, the quantum dot sheet 24b and the prism sheet 24c are attached to each other through the dots spaced apart from each other but are separated in the other areas to form the air layer G between the quantum dot sheet 24b and the prism sheet 24c.

Figure 5:
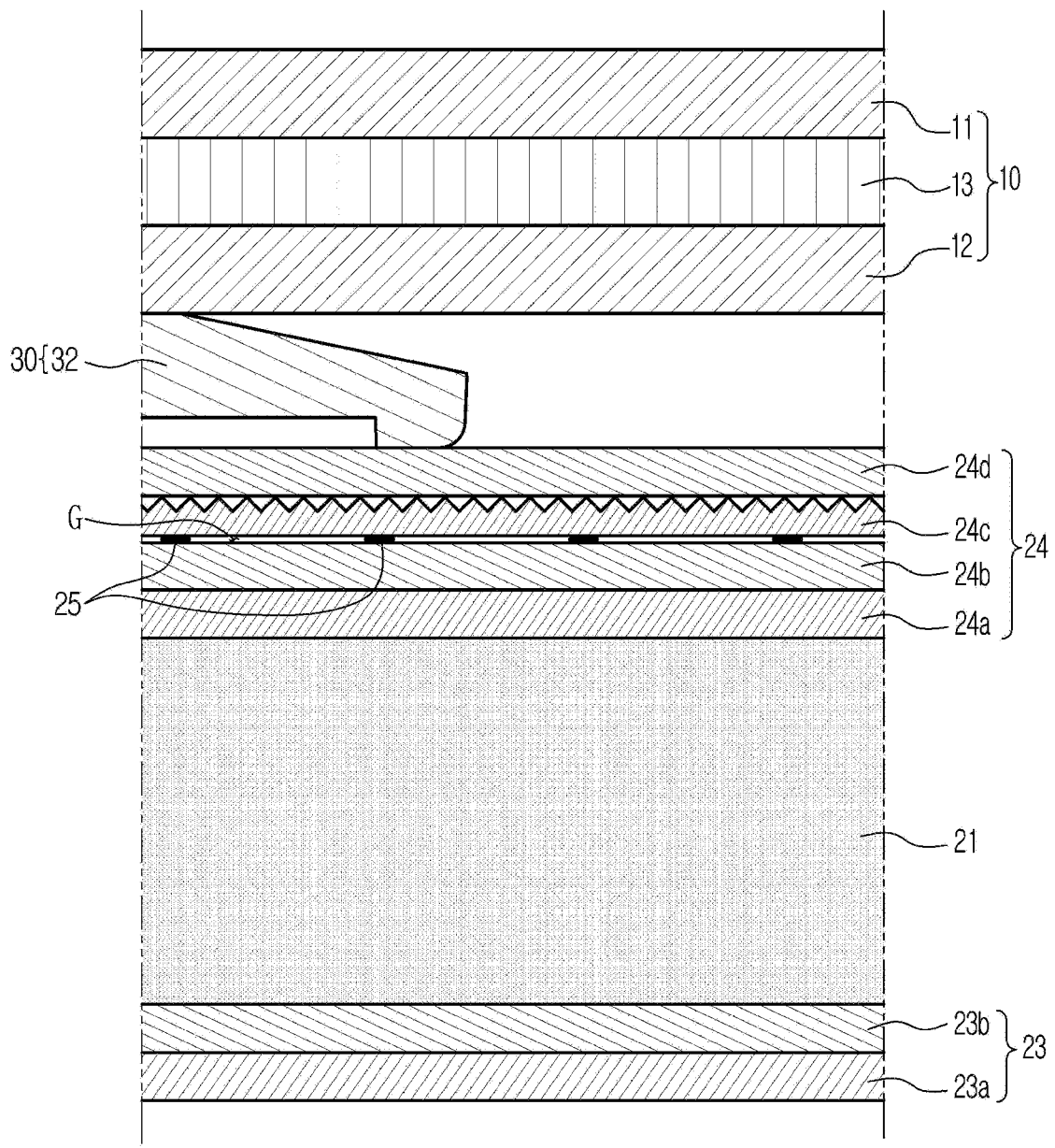

In the FIG. 5, the areas to which the adhesive 25 is applied as dots are shown as being sufficiently large, but this is only for purposes of explanation. In practice, it is preferable that the area is formed smaller than shown in FIG. 5.

Therefore, while the light guide module is formed, the diffusion angle of white light generated in the quantum dot sheet 24b may be reduced through the air layer G formed between the quantum dot sheet 24b and the prism sheet 24c.

Although the optical sheets 24 include the first dichroic sheet 24a, the quantum dot sheet 24b, the prism sheet 24c and the diffusion sheet 24d, this is merely an example, and the types of optical sheets 24 may be variously changed.

Figure 6:
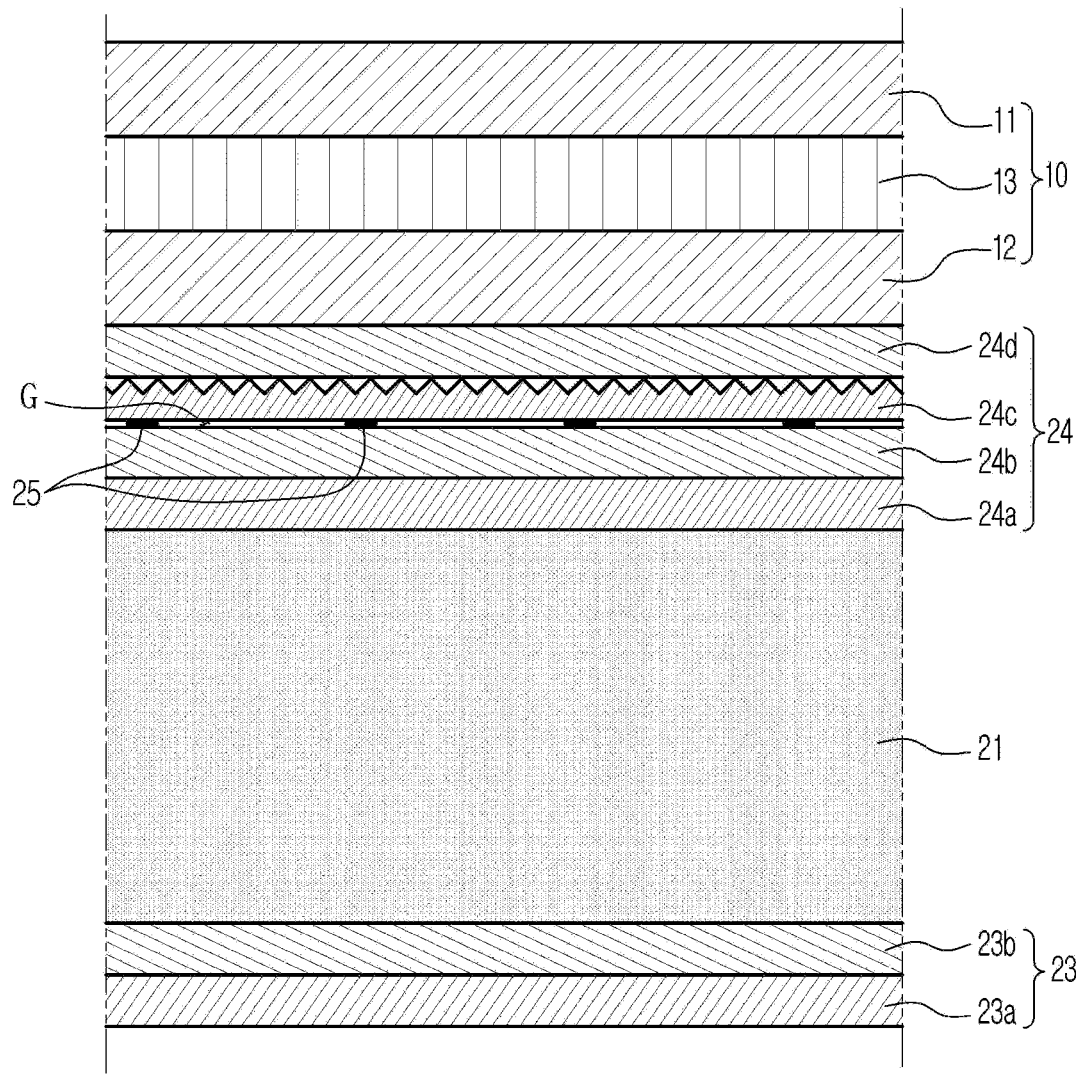
FIG. 6 is a cross-sectional view illustrating a display panel and a light guide module applied to a display apparatus according to an embodiment.

In this embodiment, the light guide module is installed to be separated from the display panel 10, but embodiments are not limited thereto. In another embodiment of the disclosure as shown in FIG. 6, the light guide plate 21, the optical sheets 24 and the reflective sheets 23, which form the light guide module, may be attached to the rear surface of the display panel 10 to be integrated with the display panel 10.

By integrating the light guide plate 21, the optical sheets 24 and the reflective sheets 23 with the display panel, the display apparatus 1 may be manufactured more easily and more thinly.

In addition, the light emitting diodes of this embodiment include the blue light emitting diodes, and the light guide module includes a first dichroic sheet 24a and a quantum dot sheet 24b, but embodiments are not limited thereto.

Figure 7:
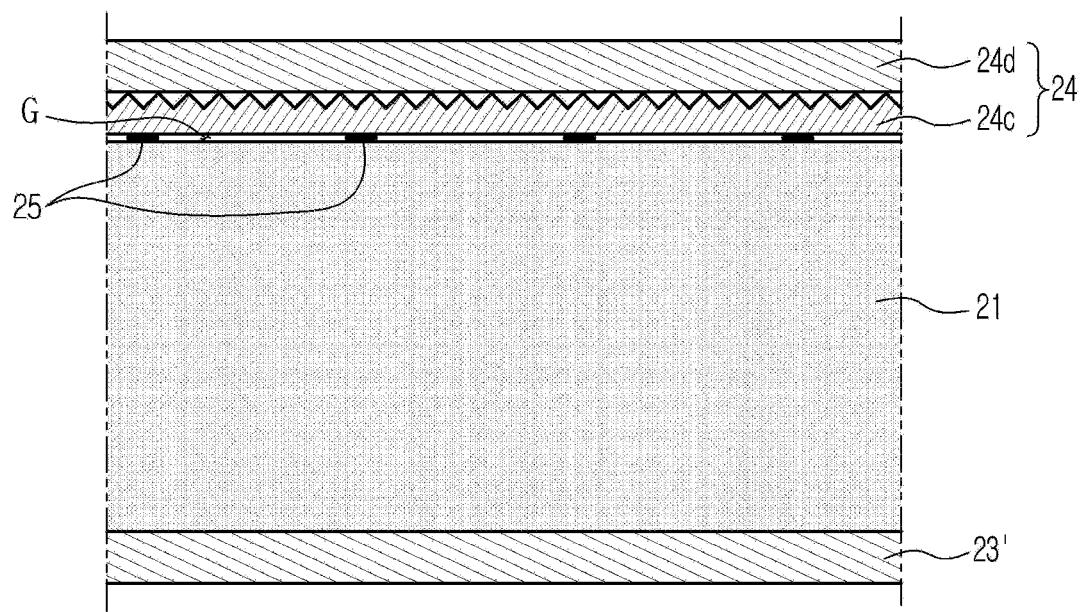
FIG. 7 is a cross-sectional view illustrating a display panel and a light guide module applied to a display apparatus according to an embodiment.

FIG. 7 illustrates a light guide module applied to a display apparatus according to an embodiment of the disclosure.

When the light emitting diode 22b is a white light emitting diode that generates white light, the light guide module includes the light guide plate 21, the prism sheet 24c attached to the front surface of the light guide plate 21, the diffusion sheet 24d attached to the front surface of the prism sheet 24c, and a white sheet 23' attached to the rear surface of the light guide plate 21 as a reflective sheet.

In the light guide module, an air layer may be formed between the light guide plate 21 and the prism sheet 24c in order to facilitate total reflection of the light incident into the light guide plate 21.

Accordingly, the light guide plate 21 and the prism sheet 24c are attached to each other by an adhesive applied as dots spaced apart from each other. Therefore, the air layer G may be formed between the prism sheet 24c and the light guide plate 21, while the prism sheet 24c is integrated with the light guide plate 21 by being attached to the front surface of the light guide plate 21.

As described above, since the display apparatus includes the light guide module in which the light guide plate and the optical sheets are integrated, the display apparatus may be easily manufactured.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus comprising:
   a display panel; and
   a backlight configured to supply light to the display panel, wherein the backlight comprises:
   a light source configured to emit light;
   a light guide plate provided on a rear side of the display panel and configured to guide the light emitted by the light source toward to the display panel; and
   a plurality of optical sheets provided between the light guide plate and the display panel, an optical sheet of the plurality of optical sheets being attached to a front surface of the light guide plate,
   wherein the plurality of optical sheets comprise:
   a quantum dot sheet configured to increase color reproducibility; and
   a prism sheet attached to a front surface of the quantum dot sheet, and
   wherein the quantum dot sheet and the prism sheet are attached to each other by a plurality of portions of a first adhesive directly contacting the quantum dot sheet and the prism sheet, and each portion from among the plurality of portions of the first adhesive is spaced apart from each of the other portions from among the plurality of portions of the first adhesive so that a first air layer is provided between the quantum dot sheet and the prism sheet.

2. The display apparatus according to claim 1, wherein the light source comprises a light emitting diode configured to generate blue light,
   wherein the plurality of optical sheets further comprise a first dichroic sheet attached to the front surface of the light guide plate and configured to selectively pass the blue light, and
   wherein the quantum dot sheet is attached to a front surface of the first dichroic sheet.

3. The display apparatus according to claim 1, further comprising a reflective sheet attached to a rear surface of the light guide plate and configured to reflect light.

4. The display apparatus according to claim 3, wherein the reflective sheet comprises:
   a second dichroic sheet attached to the rear surface of the light guide plate and configured to selectively reflect blue light; and
   a white sheet attached to a rear surface of the second dichroic sheet.

5. The display apparatus according to claim 3, wherein the reflective sheet further comprises a mirror sheet attached to the rear surface of the light guide plate.

6. The display apparatus according to claim 1, wherein the light source comprises a light emitting diode configured to generate white light, and
   wherein the prism sheet and the light guide plate are attached to each other by a plurality of portions of a second adhesive that are spaced apart from each other to form a second air layer between the prism sheet and the light guide plate.

7. The display apparatus according to claim 1, wherein one of the plurality of optical sheets is attached to a rear surface of the display panel.

8. The display apparatus according to claim 1, wherein the optical sheet of the plurality of optical sheets is attached to the front surface of the light guide plate by a plurality of portions of a second adhesive that are spaced apart from each other so that a second air layer is provided between the light guide plate and the optical sheet.

9. A display apparatus comprising:
   a display panel;
   a light guide plate provided on a rear side of the display panel; and
   a plurality of optical sheets, one of the plurality of optical sheets being attached to a front surface of the light guide plate,
   wherein at least two optical sheets of the plurality of optical sheets are attached to each other by a plurality of portions of an adhesive and each portion from among the plurality of portions of the adhesive is spaced apart from each other from among the plurality of portions of the adhesive so that an air layer is provided between the at least two optical sheets, and
   wherein the at least two optical sheets comprise a quantum dot sheet and a prism sheet attached to a front surface of the quantum dot sheet by the plurality of portions of the adhesive so that the air layer is provided between the quantum dot sheet and the prism sheet.

10. A display apparatus comprising:
    a display panel;
    a first optical sheet comprising a quantum dot sheet; and
    a second optical sheet comprising a prism sheet,
    wherein the first optical sheet is attached to the second optical sheet by a plurality of portions of an adhesive and each portion from among the plurality of portions of the adhesive is spaced apart from each other from among the plurality of portions of the adhesive so that the first optical sheet is spaced apart from the second optical sheet by air gaps between the plurality of portions of the adhesive.

11. The display apparatus according to claim 10, further comprising a light guide plate disposed on a rear side of the display panel,
    wherein the first optical sheet and the second optical sheet are interposed between the light guide plate and the display panel.

12. The display apparatus according to claim 1, wherein each portion from among the plurality of portions of the first adhesive is applied as a dot between the quantum dot sheet and the prism sheet.

13. The display apparatus according to claim 9, wherein each portion from among the plurality of portions of the adhesive is applied as a dot between the at least two optical sheets.

14. The display apparatus according to claim 10, wherein each portion from among the plurality of portions of the adhesive is applied as a dot between the first optical sheet and the second optical sheet.

\* \* \* \* \*